United States Patent
Miller

(10) Patent No.: US 9,222,770 B1
(45) Date of Patent: Dec. 29, 2015

(54) GRADIENT MEASURING APPARATUS AND SYSTEM

(71) Applicant: John C. Miller, Allendale, MI (US)

(72) Inventor: John C. Miller, Allendale, MI (US)

( * ) Notice: Subject to any disclaimer, the term of this patent is extended or adjusted under 35 U.S.C. 154(b) by 0 days.

(21) Appl. No.: 14/843,160

(22) Filed: Sep. 2, 2015

Related U.S. Application Data

(63) Continuation of application No. 13/910,648, filed on Jun. 5, 2013, now Pat. No. 9,188,436.

(60) Provisional application No. 61/656,216, filed on Jun. 6, 2012.

(51) Int. Cl.
*G01C 9/10* (2006.01)
*G01C 1/00* (2006.01)

(52) U.S. Cl.
CPC ... *G01C 9/10* (2013.01); *G01C 1/00* (2013.01)

(58) Field of Classification Search
CPC ............ G01C 9/00; G01C 9/12; G01C 19/00; G01C 19/44
USPC ............................ 33/343, 396, 397, 399, 365
See application file for complete search history.

(56) References Cited

U.S. PATENT DOCUMENTS

| | | |
|---|---|---|
| 1,206,593 A | 11/1916 | Reed |
| 1,625,683 A | 4/1927 | Rail |
| 1,984,236 A | 12/1934 | Smith |
| 2,216,086 A | 9/1940 | Meenan |
| 2,260,396 A | 10/1941 | Otto, Jr. |
| 2,292,241 A | 8/1942 | Reeves |
| 2,357,817 A | 9/1944 | Foster |
| 2,486,697 A | 11/1949 | White |
| 2,565,615 A | 8/1951 | McCoy |
| 2,677,193 A | 5/1954 | Truppe |
| 2,782,525 A | 2/1957 | Eubank |
| 3,516,055 A | 6/1970 | Snider |
| 3,556,225 A * | 1/1971 | Atsushi .................. E02F 3/841 172/4.5 |
| 3,678,885 A * | 7/1972 | Ferguson ................ E02F 3/841 116/215 |
| 3,846,781 A | 11/1974 | Smith |
| 3,900,073 A | 8/1975 | Crum |
| 4,133,116 A | 1/1979 | Devine et al. |
| 4,513,509 A | 4/1985 | Nordström |
| 5,450,909 A | 9/1995 | Stevenson |
| 5,555,942 A | 9/1996 | Matsushita et al. |
| 5,984,018 A | 11/1999 | Yamamoto et al. |
| 6,981,330 B2 | 1/2006 | Tieszen |
| 7,089,674 B1 | 8/2006 | Hendon |
| 7,317,977 B2 | 1/2008 | Matrosov |
| 7,460,941 B2 | 12/2008 | Sychra et al. |
| 8,157,473 B2 * | 4/2012 | Johnson .................. B28D 1/265 172/430 |
| 8,205,347 B2 * | 6/2012 | Friesen .................... B66C 23/90 33/365 |
| 2005/0210692 A1 | 9/2005 | Tieszen |
| 2010/0299031 A1 | 11/2010 | Zhdanov et al. |
| 2013/0326894 A1 * | 12/2013 | Miller ...................... G01C 1/00 33/343 |

* cited by examiner

*Primary Examiner* — Yaritza Guadalupe-McCall
(74) *Attorney, Agent, or Firm* — Price Heneveld LLP

(57) ABSTRACT

A gradient measuring apparatus includes a gimbal assembly operably supported in a construction vehicle for viewing by an operator to see gradient indications in fore-aft and sideways directions. The gimbal assembly includes an outer orb with pointer that moves with the vehicle, and an inner orb with concentric circles that stays in a true vertical by gravitational forces, the combination of which simultaneously accurately reflects a fore-aft and sideways grade at which a ground surface is being cut in an excavating process.

9 Claims, 6 Drawing Sheets

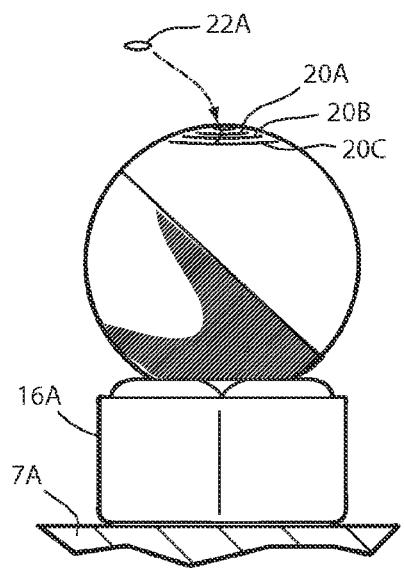
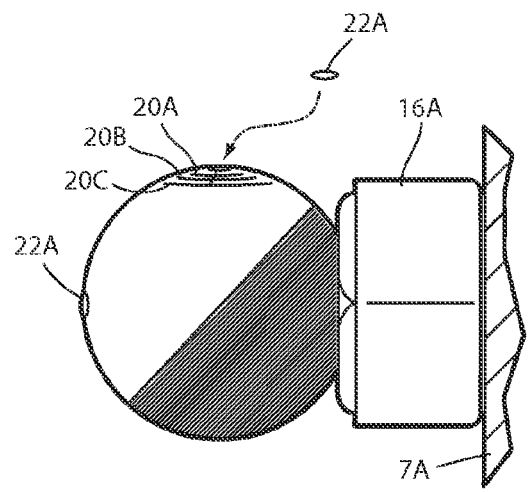
Fig. 11    Fig. 12
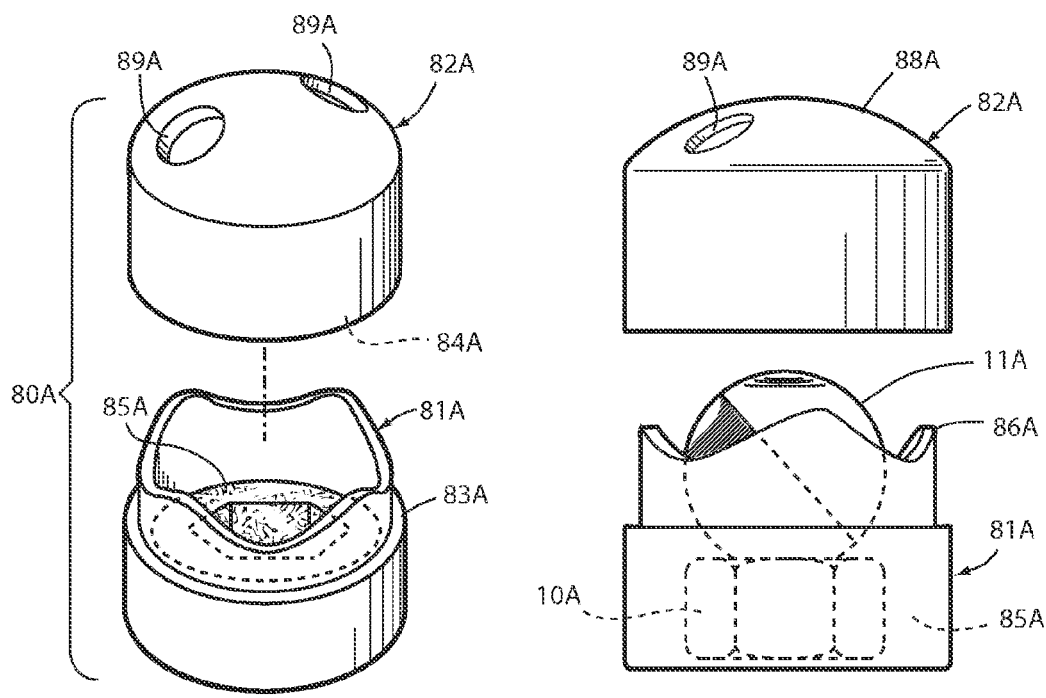
Fig. 13    Fig. 14

GRADIENT MEASURING APPARATUS AND SYSTEM

CROSS-REFERENCE TO RELATED APPLICATIONS

This application is a continuing application of U.S. patent application Ser. No. 13/910,648, filed Jun. 5, 2013, entitled GRADIENT MEASURING APPARATUS AND SYSTEM, now U.S. Pat. No. 9,188,436 which claims benefit of Provisional Application Ser. No. 61/656,216, filed Jun. 6, 2012, entitled GRADIENT MEASURING APPARATUS, the entire contents of which are incorporated herein by reference.

BACKGROUND OF THE INVENTION

The present invention generally relates to a gradient measuring apparatus and system using same, and more specifically, to a gradient measuring apparatus for use in conjunction with excavating machinery to accurately indicate to a user the slope angle of an excavating vehicle as positioned on a surface being excavated or graded.

Excavating and earth moving equipment, such as for paving, road grading, excavating, landscaping, building construction, and the like, is often used to grade land mass to a proper slope angle (i.e. gradient). Modern equipment sometimes includes an electronic grade indicator on its blade or scraper. However, equipment operators continue to rely in large part on operator feel. A problem is that operator feel is generally unreliable and inconsistent, since a feel for a given slope is not natural, and even after an operator gets the "feel," the operator still is often adversely influenced by surroundings and equipment variables.

SUMMARY OF THE PRESENT INVENTION

In one aspect of the present invention, construction equipment comprises a construction vehicle having an operator location with a first surface and having a structural blade configured to grade and move earth; and a gradient-indicating assembly supported in a visible position on the first surface, the gradient-indicating assembly including a plurality of concentric circles and a pointer, one of the concentric circles and the pointer moving with the vehicle as the vehicle tilts in a fore-aft direction and in a side-to-side direction, and the other of the concentric circles and the pointer remaining in a true vertical position, the pointer thus simultaneously showing on the concentric circles a fore-aft levelness and a side-to-side levelness of the construction vehicle relative to a true level position of the construction vehicle.

In another aspect of the present invention, construction equipment for moving earth during a construction project, comprises a construction vehicle having ground-engaging mobility components, such as wheels or tracks, and having a structural blade configured to grade and move earth as the mobility components engage terrain under the construction vehicle; and a gradient-indicating assembly supported in the construction vehicle in a visible position, the gradient-indicating assembly including a plurality of concentric circles and a pointer, one of the concentric circles and the pointer moving with the vehicle as the vehicle tilts in a fore-aft direction and in a side-to-side direction, and the other of the concentric circles and the pointer remaining in a true vertical position relative to gravitational forces, such that a relative position of the pointer on the concentric circles thus simultaneously shows a fore-aft levelness and a side-to-side levelness of the construction vehicle relative to a true level position of the construction vehicle.

In another aspect of the present invention, a method of construction comprises providing a construction vehicle having an operator location with a first surface and having a structural blade configured to grade and move earth; providing a gradient-indicating assembly supported in a visible position on the first surface, the gradient-indicating assembly including a plurality of concentric circles and a pointer; moving one of the concentric circles and the pointer with the vehicle as the vehicle tilts in a fore-aft direction and in a side-to-side direction, with the other of the concentric circles and the pointer remaining in a true vertical position, so that the pointer thus simultaneously shows on the concentric circles a fore-aft levelness and a side-to-side levelness of the construction vehicle relative to a true level position of the construction vehicle; and controlling the construction vehicle and blade to achieve a desired gradient in both of the fore-aft and side-to-side directions.

In another aspect of the present invention, a method of construction where earth is moved during a construction project, comprises providing a construction vehicle having ground-engaging mobility components, such as wheels or tracks, and having a structural blade configured to grade and move earth as the mobility components engage terrain under the construction vehicle; providing a gradient-indicating assembly supported in the construction vehicle in a visible position, the gradient-indicating assembly including a plurality of concentric circles and a pointer; moving one of the concentric circles and the pointer as the vehicle tilts in a fore-aft direction and in a side-to-side direction, with the other of the concentric circles and the pointer remaining in a true vertical position relative to gravitational forces, such that a relative position of the pointer on the concentric circles thus simultaneously shows a fore-aft levelness and a side-to-side levelness of the construction vehicle relative to a true level position of the construction vehicle; and controlling the construction vehicle and blade to achieve a desired gradient in both of the fore-aft and side-to-side directions.

It is contemplated that an appearance of the present gradient indicator apparatus, and gimbal assembly, and gimbal holder, are novel, ornamental, unobvious, and also surprising and unexpected in appearance and function.

An object of the present invention is to provide a gradient indication apparatus that is useable in construction excavation vehicles, and where the apparatus, once calibrated, can be easily transferred from vehicle to vehicle without cumbersome and time-consuming recalibration.

An object of the present invention is to provide a gradient indication apparatus that is effective, intuitive to use, and yet that is relatively non-complex and made of few components.

An object of the present invention is to provide a gradient indication apparatus that is immediately useable, yet durable, robust, and does not require extensive training or maintenance.

These and other aspects, objects, and features of the present invention will be understood and appreciated by those skilled in the art upon studying the following specification and appended drawings.

BRIEF DESCRIPTION OF THE DRAWINGS

FIGS. 11-12 are side views showing the gradient indicator apparatus engaging two bases that are supported in different angular relations to vertical.

FIGS. 13-14 are perspective and side views of the gimbal assembly stored in a gimbal carrier.

DETAILED DESCRIPTION OF EMBODIMENTS

Figure 1:
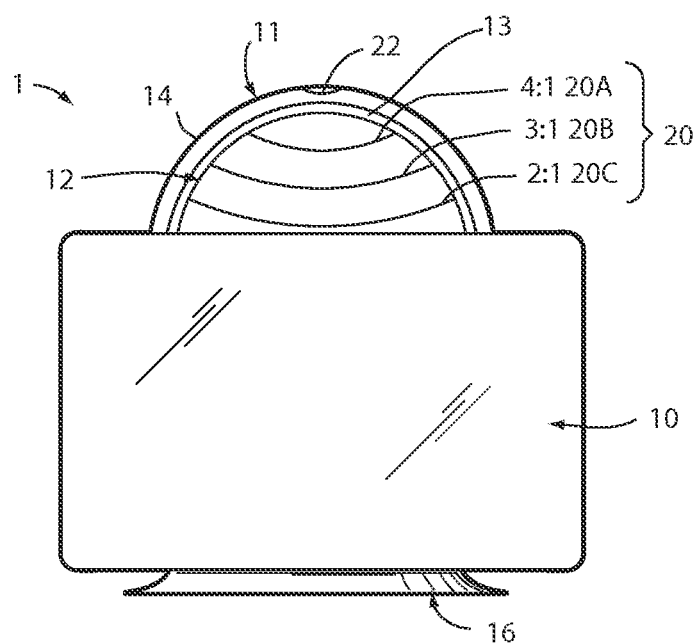
FIG. 1 is rear elevational view of a gradient indicator according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts disclosed herein. Hence, specific dimensions and other physical characteristics relating to the embodiments disclosed herein are not to be considered as limiting, unless expressly stated otherwise.

The present invention includes a gradient indicating apparatus 1 (FIGS. 1-2) has a base unit 10 with a gimbal assembly 11 disposed thereon which operates similar to a compass, wherein an inner orb 12 is suspended in a semi-viscous fluid 13 such that the inner orb 12 can fully rotate about multiple axes within an orbital shell casing or support housing 14. The apparatus 1 includes indications on the inner orb 12, in the form of gradient ring indications, further discussed below, that allow an operator of an excavating vehicle to know the grade or slope of a land surface being graded. Apparatuses known in the art for assisting in grade determination are generally directed toward methods of indicating the angle of a dozer blade for assisting an excavating vehicle operator in maintaining a predetermined dozer blade angle. Unlike these known apparatuses, the present invention relays information to the user regarding the grade of the surface that the excavating vehicle is presently on and will be cut, rather than the angle of the dozer blade.

Figure 3:
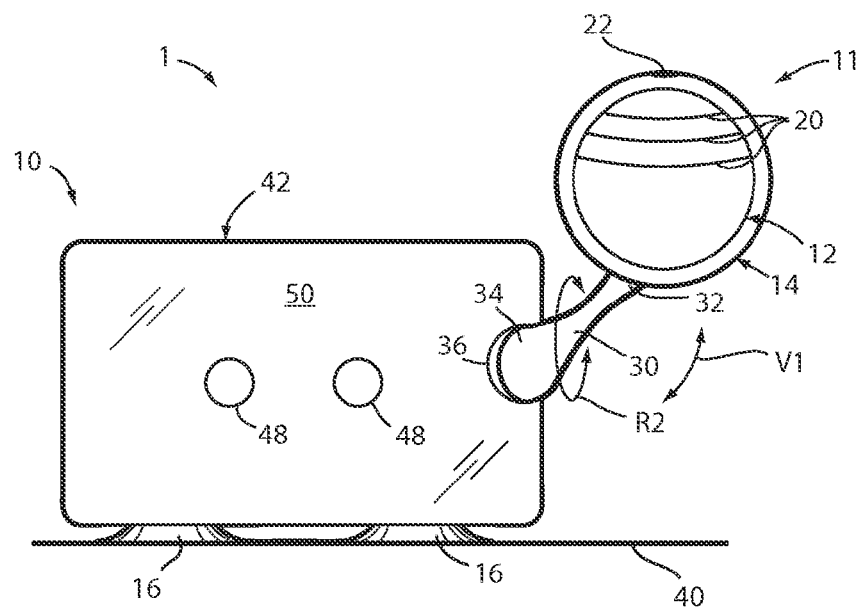
FIG. 3 is a side elevational view of another embodiment of the present invention.
Figure 4:
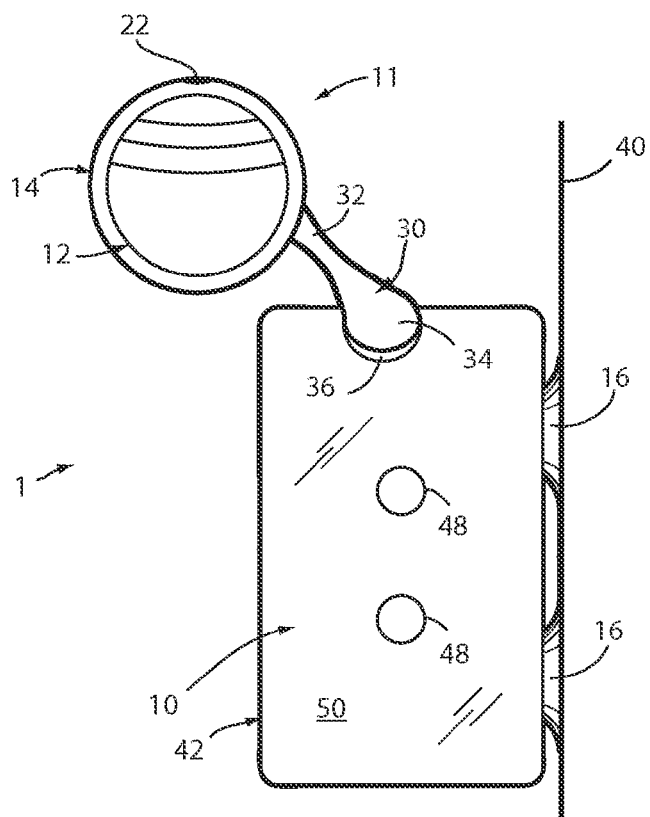
FIG. 4 is a side elevational view of the gradient indicator of FIG. 3.

As shown in FIG. 1, the base unit 10 includes a mounting assembly 16 for mounting the gradient indicating apparatus 1 to any surface located in the operator's area of an excavating vehicle. As shown in FIGS. 3 and 4, and further discussed below, the gradient indicating apparatus 1 can be mounted to both vertical and horizontal surfaces, and any angled surface there between, while the inner orb 12 will still deliver accurate information on the gradient of the land surface that the excavating vehicle is working on to the vehicle operator. FIGS. 1, 3 and 4 show the use of suction cups as the base mounting assemblies 16, but it is contemplated that any mounting assembly that can hold the apparatus 1 in place on a surface in an excavating vehicle will work (such as magnets, hook-and-loop Velcro®, double-sided tape/adhesive, brackets/fasteners, and the like). Further, while the gradient indicating apparatus 1 is described herein for use in an excavating vehicle, it is contemplated that the gradient indicating apparatus 1 can be used in any number of machines or industries where gradient indications are needed, such as, but not limited to, paving machines, road grading vehicles, excavating and earth moving equipment, lawn maintenance and landscaping equipment, surveying machinery, and the like.

Figure 2:
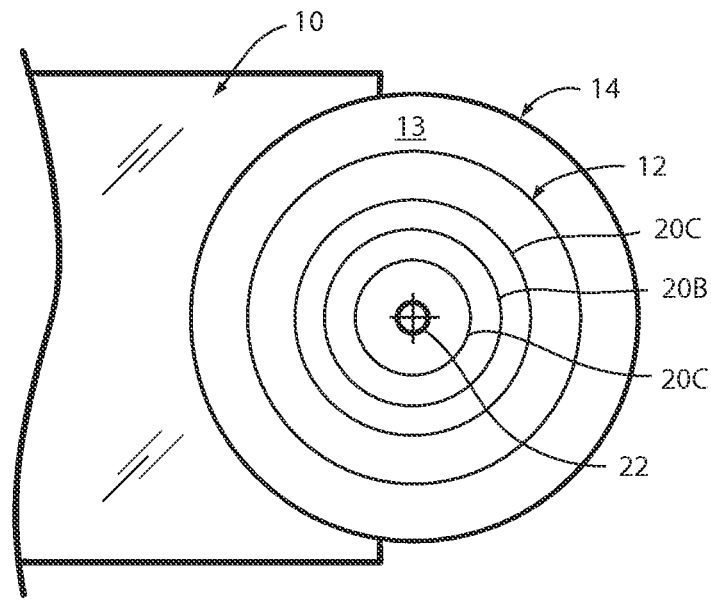
FIG. 2 is a fragmentary top plan view of the gradient indicator of FIG. 1.

As shown in FIGS. 1-4, and best shown in FIG. 2, gradient indicating rings 20a, 20b and 20c can be viewed on the inner orb 12, and these gradient indicators can be referenced against a center indicator 22 disposed top and center on the gimbal support housing 14 in a bullseye-type configuration. Calibration of the apparatus 1 can be accomplished such as by parking the vehicle on a flat surface with the apparatus 1 attached to the vehicle, and then by placing (e.g. sticking) a center indicator 22 (e.g. a sticky dot) at a center point on the outer orb 14 in a location centered on the gradient rings 20a-20c. In this way, the gradient rings, collectively referred to as rings 20, indicate the land surface slope angle of the land surface that the excavating vehicle is grading, since the center indicator 22 moves to different rings 20a-20c as the vehicle tilts on the ground being graded. Thus, the vehicle operator can control the excavating equipment to keep the center indicator 22, disposed on the gimbal housing 14, on the gradient ring desired for the grade cutting job at hand. Standard gradients used in the excavating industry include gradients such as 4:1 (indicated by gradient ring 20a), 3:1 (indicated by gradient ring 20b), and 2:1 (indicated by gradient ring 20c). The gradient rings, 20a, 20b and 20c, are intended to indicate ratios of horizontal length to vertical height in feet, such that the 4:1 grade indication of gradient ring 20a is a less severe grade as compared to the 2:1 grade indication of gradient ring 20c, which can be as much as a 45% angle. While the gradient rings 20 are shown in the embodiments depicted herein as standard gradients measured in feet used in the U.S. excavating industry, it is contemplated that the gradient indicating apparatus 1 can have any gradient indication disposed on the inner orb 12 for any specific application. Further, the gradient indicators need not be in the form of rings, but are shown herein in ring form for exemplary purposes only.

Referring to the embodiment shown in FIG. 3, a frictionally adjustable tether 30 is shown which operably and adjustably couples the gimbal assembly 11 to the base unit 10. The frictionally adjustable tether assembly 30 allows the operator to move the gimbal assembly 11 to a desired position for proper viewing. In this way, the gimbal assembly 11 can be positioned in a plurality of axes as indicated by arrow R1, which indicates a rotational axis of movement, as well as arrow V1, which indicates an arcuate and vertical axis of movement. The frictionally adjustable tether assembly 30, as indicated in FIGS. 3 and 4, has a distal end 32 which couples to the gimbal assembly 11, and a proximal end 34 which adjustably couples to the base unit 10. In the embodiments shown in FIGS. 3 and 4, the proximal end 34 is depicted in the form of a generally spherical end adapted to frictionally fit within a socket 36 disposed within an interior of the base unit 10. In this way, the base unit 10 can be mounted on a vehicle surface, such as horizontal surface 38, shown in FIG. 3, or vertical surface 40, shown in FIG. 4, and the operator can adjust the position of the gimbal assembly 11 by moving the gimbal assembly 11 to a desired location using the frictionally adjustable tether assembly 30 that operates like a balland-socket joint to retain the gimbal assembly 11 in a desired location. While FIGS. 3 and 4 depict a frictionally adjustable tether for use on coupling the gimbal assembly to the base unit, it is contemplated that any coupling means known in the art can be used to couple the gimbal assembly to the base unit, such as suction cup means, Velcro®, magnetic means, or any other such coupling device. Further, it is contemplated that the gimbal assembly can be releasably coupled to the base unit, such that the gimbal assembly can be removed by the user for placement on another base unit in another vehicle if desired.

In operation, and with reference to FIG. 2, the gimbal assembly 11 comprises an inner orb 12, having gradient indicating rings 20 disposed thereon, wherein the inner orb 12 is suspended in a fluid-like substance 13 within a support housing 14. The suspension of the inner orb 12 within the support housing 14 is a general Cardan Suspension known in the art and often used in compasses and like apparatuses. Being suspended in this manner, the inner orb 12 remains essentially "immobile" (i.e. gravitationally biased to a constant vertical position) as the support housing 14 moves in spatial relation to the land surface being graded by the excavating vehicle. In this way, the inner orb 12 may move ever so slightly, but will resiliently return to an upright orientation as indicated in FIGS. 1-4.

Figure 5:
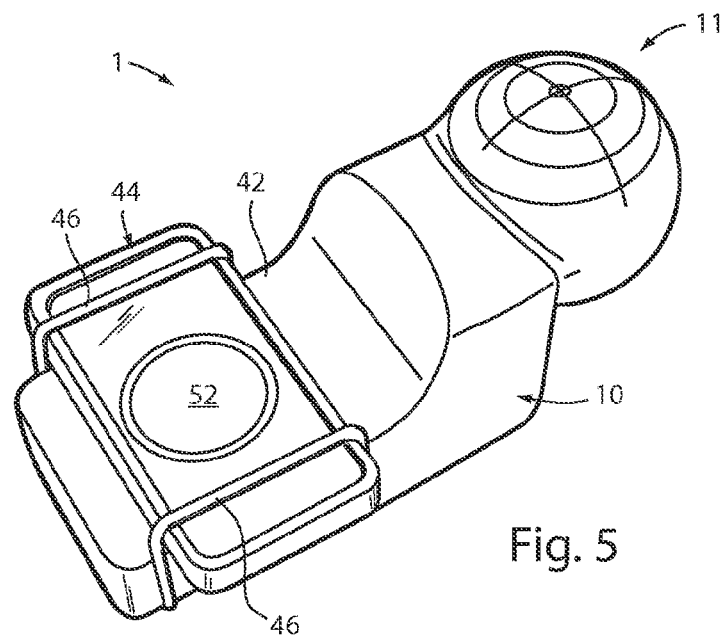
FIG. 5 is a perspective view of a model of yet another embodiment of the present invention.

The gradient indicating apparatus 1 (FIGS. 3-5) further comprises a landing surface 42 which can be used to mount an electronic device, such as electronic device 44 shown in FIG. 5. The illustrated electronic device 44 is mounted to the landing surface 42 by attachment assemblies 46 which cooperate with apertures 48 disposed on side walls 50 of the base unit 10. In the embodiment shown in FIG. 5, the electronic device 44 is contemplated to be a smart phone that is coupled to the landing surface 42 of the base unit 10 by attachment assemblies 46 which are shown in FIG. 5 as resilient, or elastic, cords that further couple to apertures 48 (FIGS. 3-4) disposed on the side walls 50 of the base unit 10. While the electronic device 44, as shown in FIG. 5, is depicted as a smart phone, it is contemplated that any electronic device capable of electronically indicating gradient variations and/or GPS location and/or elevation would be suitable for use in combination with the present invention. Further, any suitable attachment assemblies may be used to couple the electronic device 44 to the landing surface 42.

The electronic device, such as electronic device 44 shown in FIG. 5, serves as an electronic reference point for the physical gimbal assembly 11. In this way, the gimbal assembly 11 can be cross-referenced to ensure grading accuracy. Further, it is contemplated that the electronic device, such as electronic device 44 shown in FIG. 5, can comprise an application which is displayed on a display screen 52 (FIG. 5) that allows the vehicle operator to preprogram gradient slopes desired for an intended grading job. The electronic device can have parameters preprogrammed therein for alerting the vehicle operator of vehicle positions that are off camber to the preselected gradient indication programmed into the device. The alerting features of the electronic device can be in the way of sound alerts, display screen color changes, vibration alerts, or any like alerting system that can appropriately relay the off camber position of the vehicle to the vehicle operator. Further, it is contemplated that the electronic device can have GPS positioning features which will allow for the vehicle operator to calculate exact location information into the device, as well as topographic location. Programmed reference points on a job site can then be compared to one another for differences in distance and height, thereby assisting the vehicle operator in selecting the most efficient approach in cutting a select grade.

As noted above, the gradient indicating apparatus 1 of the present invention can be used in a wide variety of applications across different industries. With specific applications, it is contemplated that different base units, landing surfaces, mounting assemblies and gimbal assemblies will be needed to properly convey gradient information to a user of the apparatus. For instance, a paving machine may need a gimbal assembly the size of a standard soccer ball (approximately 22 cm in diameter) to properly convey gradient indications needed for the paving industry. As such, a proper base unit, mounting means for securing the base unit to a surface, and tethers for the securing the gimbal assembly to the base unit will be needed are hereby contemplated by the present invention. Road graders needing a 2% grade indication will also need a larger appropriately sized gimbal assembly 11, while lawn maintenance equipment users may require a much smaller sized gimbal assembly 11 to accurately convey useful gradient information to the user.

In the past, excavators were generally left to feel for gradient changes and experience played a large role in determining the feel for a grade cut needed on a land surface. The present invention allows for an excavating machine operator to determine the grade needed, such as a grade indication given on specific plans drawn up by civil engineers, and set the vehicle to a proper pitch wherein the grade indicating rings, such as grade indicating rings 20a, 20b, and 20c shown in FIG. 1, align with the center indicator 22 of the support housing 14 of the gimbal assembly 11, such that grade can be cut quickly and accurately without subjective factors coming into play. The inner orb 12 will remain in an upright position as the excavating vehicle navigates the twists and turns of any given job without the need for recalibration at any given point. Thus, large excavating jobs can be cut quickly and accurately with the use of the present invention, and once the selected gradient ring 20 is located in the top center gradient indicator 22, the operator can maneuver the vehicle in a full 360 degrees to cut grade at any axis of vehicle movement desired. With the 360 degree workability of the present invention, the present invention can be used in any direction of vehicle movement without the need to recalibrate or reset the present invention once a gradient scale is selected and properly positioned in the bullseye-type center gradient indicator 22. The present invention is thus capable of providing an intuitive feel for the grade being cut that the user can sense in use. The present invention is able to indicate the grade being cut in an accurate manner such that the user's intuitive feeling, as positioned on the excavating vehicle, coincides with the grade indication on the present invention.

FIGS. 6-14 show a modified gradient indicator apparatus 1A and system utilizing same. In this modified apparatus, similar and identical components, features, and characteristics to apparatus 1 are identified using the same numbers but with the addition of a letter "A", "B" or etc. This is done for convenience and to reduce redundant discussion, and not for another purpose.

Figure 6:
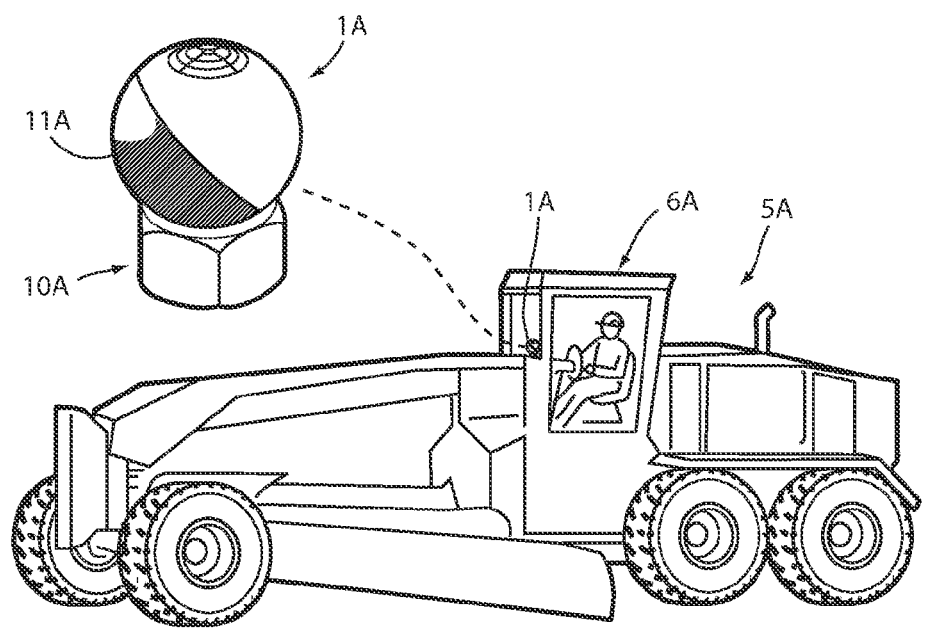
FIG. 6 is a side view of an excavator/grader vehicle with a gradient indicator apparatus embodying the present invention attached thereto.

FIG. 6 is a side view of an excavator/grader vehicle 5A with a modified gradient indicator apparatus 1A embodying the present invention attached to a surface 7A in its operator cabin 6A. As illustrated, the modified gradient indicator apparatus 1A can be attached to a horizontal or vertical or angled solid surface, such as on a vehicle instrument panel or dash area or side window or adjacent a control-handles area of a vehicle.

Figure 7:
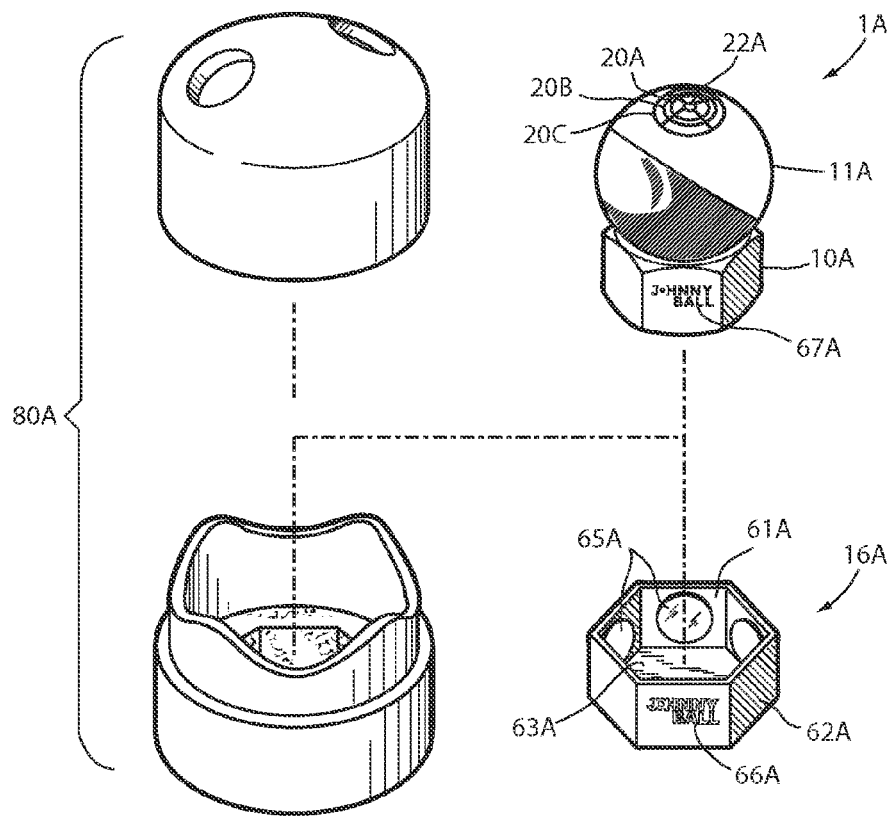
FIG. 7 is a side view of the gradient indicator apparatus, including its base unit, the gimbal assembly, and a gimbal carrier.

FIG. 7 is a side view of the gradient indicator apparatus 1A, including its base unit 10A, a gimbal assembly 11A, a mounting assembly 16A, and a gimbal carrier 80A. Specifically, the illustrated mounting assembly 16A (FIG. 7) includes a hex-shaped socket 61A with hex-sides 62A and flat bottom 63A.

The gimbal assembly 11A includes a base unit 10A with flat bottom having magnets 64A for magnetically releasably attaching to metal in the flat bottom 63A. Further, the hex-sides 62A include five foam pads 65A and one no-pad side 62A with indicia 66A. By matching indicia 67A on the base unit 10A with indicia 66A on the mounting assembly 16A, the gimbal assembly 11A is positioned in the base unit 10A in a known orientation. To calibrate the apparatus 1A to a particular vehicle a first time, the vehicle is placed on a flat ground surface, and a center indicator 22A is placed at a center of the ring gradient indicators 20a, 20b, 20c. For example, the center indicator 22A can be an adhesive dot or marker dot. Thus, once a mounting assembly 16A is installed in a given excavating vehicle (FIG. 11), the gimbal assembly 11A can be removed and later reinstalled (FIG. 12) without having to again recalibrate (i.e. relevel) the gimbal assembly 11A to the particular vehicle. Notably, by placing a different center indicator 22A on the outer orb 14A for each different vehicle, the same gimbal assembly 11A can be used on different vehicles simply by the operator noting which center indicator 22A is the center point for indicating levelness and grade for each vehicle. (See FIG. 12).

Figure 8:
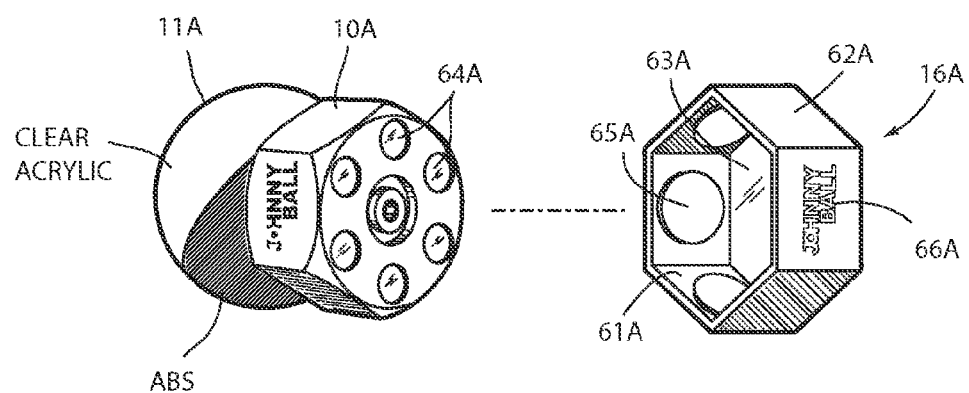
FIG. 8 is an exploded perspective view showing the gradient indicator apparatus of FIG. 7 engaging a base unit.

FIG. 8 is an exploded perspective view showing the gradient indicator assembly 11A of FIG. 7 with its base unit 10A engaging a mounting assembly 16A, including the hex-shaped socket 61A, hex-sides 62A, flat bottom 63A, flat-bottom-attaching magnets 64A, foam pads 65A, and the one no-pad side 62A with indicia 66A. FIG. 8 also illustrates that half of the outer orb 14A is transparent acrylic, while the other half is opaque ABS plastic material, with their parting line extending at a 45 degree angle to vertical. By this arrangement, a portion of the transparent acrylic of the outer orb 14A can be positioned to face upward, regardless of whether the gradient indicator assembly 11A (and mounting assembly 16A) is attached to a horizontal or vertical or angled mounting surface. A size of the present components can be adapted as needed for particular jobs and applications. For example, for gradient indicator assemblies in heavy construction equipment/vehicles, the outer orb 14A may be about 3 inches in diameter, with a shell thickness of about 3/16", and the inner orb 12A being about 3/16" thick, leaving a fluid thickness between orbs of about 1/8"-1/4" thickness. An inside of the inner orb 12A is air filled and contains an inner counterweight 72A at its bottom, which weight keeps the orb gravitationally biased to center.

Figure 9:
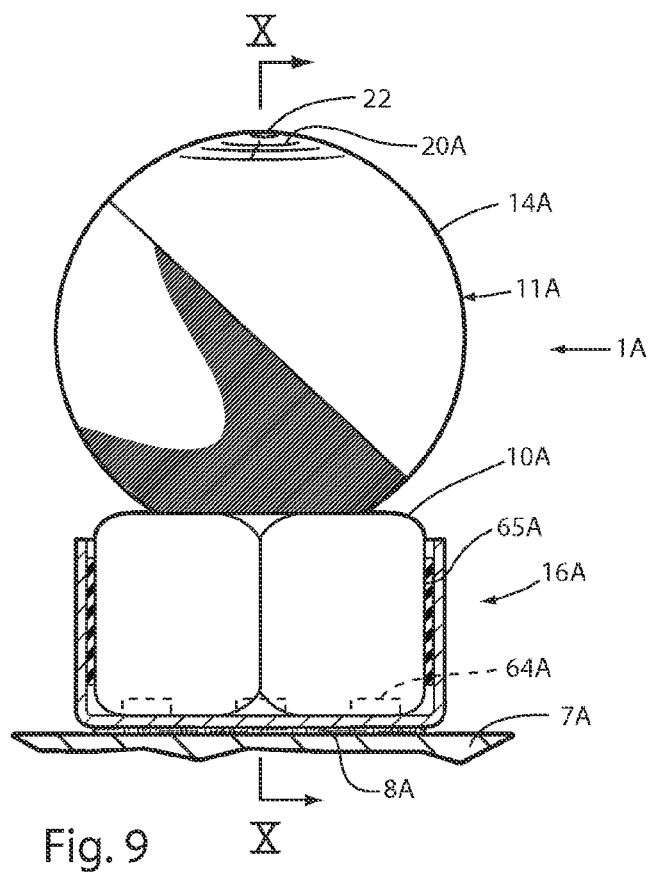
FIG. 9 is an enlarged side view of the gradient indicator apparatus of FIG. 7.
Figure 10:
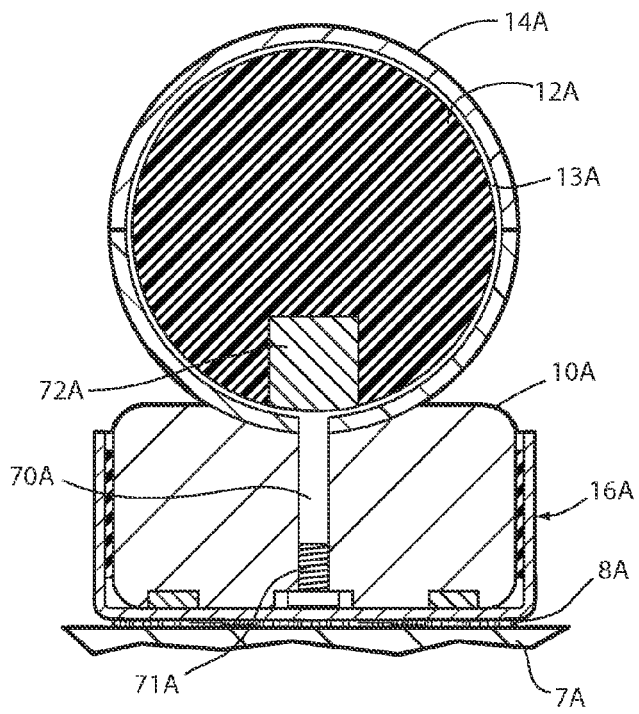
FIG. 10 is a cross sectional view taken along lines X-X in FIG. 9.

FIG. 9 is an enlarged side view of the gradient indicator assembly 11A and base unit 10A of FIG. 7, and shows a relationship of surfaces and components when a hex-shaped bottom protruding portion of support housing 14A of the gradient indicator assembly 11A is engaged with mounting assembly 16A. The particular mounting assembly 16A is attached by double-sided sticky tape to the vehicle surface 7A. FIG. 10 is a cross sectional view taken along lines X-X in FIG. 9, and shows a relation of the inner and outer orbs 12A, 14A and fluid 13A, along with a fill passage 70A and plug 71A. FIG. 10 also shows the non-magnetically-responsive weight 72A inside the inner orb 12A. It is noted that the mass of the weight 72A will change depending on a viscosity of the fluid 13A, and depending on a responsiveness desired in multi-axial movement of the inner org 12A in the outer orb 14A. A reasonable viscosity will provide good vibration dampening while also allowing good responsiveness of movement of the inner orb 12A.

FIGS. 11-12 are side views showing the gradient indicator apparatus engaging two bases that are supported in different angular relations to vertical, FIG. 11 showing a first center indicator 22A, (for use with a first vehicle) and FIG. 12 showing a second center indicator 22A' as well as the first center indicator 22A (for use with a second vehicle).

FIGS. 13-14 are perspective and side views of a gimbal carrier 80A, with FIG. 14 also showing the gimbal assembly 11A stored in the gimbal carrier 80A (but with its top shell exploded away). The gimbal carrier 80A includes mating bottom and top shells 81A and 82A having lips 83A and 84A that slip together with sufficient frictional force to resist falling apart. The illustrated bottom shell 81A is hollow and about 5-6 inches diameter (depending of course on a size of the gimbal assembly 11A, which is 2¾ inches in diameter and base unit 10A, which is 3 inches in diameter. The gimbal carrier 80A has a foam insert 85A with a hex-shaped socket to frictionally receive the protruding lower portion of the gimbal base unit 10A, with the outer orb 14A being spaced from and protected by the shells 81A and 82A. The upper edge 86A of the bottom shell 81A undulates between high and low positions, with the high positions being sufficiently high to protect an acrylic outer orb 14A (even with the top shell 82A removed), and with the low positions being sufficiently low to allow a person to reach into and grasp the outer orb 14A to pull the gimbal assembly 11A out from storage inside the carrier 80A. The upper shell 82A includes a cylindrical lower ring portion that engages the lip 83A, and further includes a dome-shaped portion 88A that closes a top of the carrier 80A. Two holes 89A are located in the dome-shaped portion 88A for receiving a user's fingers to pull the top shell 82A from the bottom shell 81A.

Thus, a gradient measuring apparatus is provided that includes a gimbal assembly operably designed for mounting in a visible position in a vehicle. The gimbal assembly includes a support housing and a multi-axis gravity-biased-to-center inner orb. One of the support housing and the inner orb includes gradient indicators, and the other of the support housing and the inner orb includes a center indicator, with both the center and gradient indicators being simultaneously visible. By this arrangement, the center indicator accurately reflects on the gradient indicators a grade at which a surface is being cut in an excavating process when viewed in combination with the gradient indicators due to multi-axis gravitation movement of the inner orb.

Also, a gradient measuring system is provided that includes first and second mounting assemblies units in first and second vehicles, respectively; and a gimbal assembly having a support housing releasably and interchangeably engaging one of the first and second mounting assemblies and including a multi-axis gravity-biased-to-center inner orb. One of the support housing and the inner orb includes gradient indicators, and the other of the support housing and the inner orb includes first and second location indicators with both being visible, wherein the first location indicator accurately reflects the grade at which a surface is being cut in an excavating process when viewed in combination with the gradient indicators on the first vehicle, and the second location indicator accurately reflects the grade at which a surface is being cut in an excavating process when viewed in combination with the gradient indicators on the second vehicle, the first and second location indicators being at different locations.

Also, a gradient measuring system is provided that includes a gimbal assembly having a base unit and having a gimbal assembly with a support housing including an outer orb and an attachment assembly releasably engaging the base unit; the gimbal assembly including a multi-axis gravity-biased-to-center inner orb; and a gimbal carrier having a socket shaped to releasably engage the attachment assembly while protecting the gimbal assembly including the inner orb.

Also, a gradient measuring apparatus is provided that includes a vehicle with a first surface, and a gimbal assembly operably supported in a visible position on the first surface, the gimbal assembly including an outer orb, fluid within the outer orb, and a multi-axis gravity-biased-to-center inner orb within the outer orb and fluid, the inner orb including ring gradient indicators and the outer orb a location indicator with both the gradient and location indicators being simultaneously visible, wherein the location indicator accurately reflects on the gradient indicators a grade at which a surface is being cut in an excavating process when viewed in combination with the gradient indicators.

Also, a gradient measuring apparatus is provided that comprises a base unit adapted to be operably coupled to a surface within a vehicle, and a gimbal assembly operably coupled to the base unit such that it is visible by the user. The gimbal assembly includes a support housing having reference indicators for a free moving liquid suspended inner orb having gradient indicators disposed thereon, wherein the inner orb has orthogonal pivot axes relative to the support housing such that the inner orb, in its suspended state, appears immobile relative to the housing. In this way, the gradient indicators of the inner orb accurately reflect the grade at which a surface is being cut in an excavating process when viewed in combination with the reference indicators disposed on the support housing.

One feature of the present invention is that the base unit has a landing area and an attachment assembly is provided that is adapted to couple an electronic device to the landing area of the base unit, wherein the electronic device is further adapted to provide electronic gradient indication data to be used as a cross reference to the gimbal assembly.

It is contemplated that of use methods related to the above are also novel, useful, and unobvious, in that they provide surprising and unexpectedly useful results and functionality.

It is contemplated that an appearance of the present gradient indicator apparatus, and gimbal assembly, and gimbal holder, are novel, ornamental, unobvious, and also surprising and unexpected in appearance and function.

The present invention provides a gradient indication apparatus that is useable in construction excavation vehicles, and yet it can easily be transferred from vehicle to vehicle without cumbersome and time-consuming recalibration. The present invention provides a gradient indication apparatus that is effective, intuitive to use, and yet that is relatively non-complex and made of few components. Still further, the present gradient indication apparatus is immediately useable, yet durable, robust, and does not require extensive training or maintenance.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

I claim:

1. Construction equipment comprising:
   a construction vehicle having an operator location with a first surface and having a structural blade configured to grade and move earth; and
   a gradient-indicating assembly supported in a visible position on the first surface, the gradient-indicating assembly including a plurality of concentric circles and a pointer, one of the concentric circles and the pointer moving with the vehicle as the vehicle tilts in a fore-aft direction and in a side-to-side direction, and the other of the concentric circles and the pointer remaining in a true vertical position, the pointer thus simultaneously showing on the concentric circles a fore-aft levelness and a side-to-side levelness of the construction vehicle relative to a true level position of the construction vehicle.

2. The construction vehicle defined in claim 1, wherein the concentric circles are gradient indicators formed on an inner orb, and the pointer is a center indicator is formed on an outer orb, with the inner orb being supported for floating rotation about multiple axes within the outer orb.

3. Construction equipment for moving earth during a construction project, comprising:
   a construction vehicle having ground-engaging mobility components, such as wheels or tracks, and having a structural blade configured to grade and move earth as the mobility components engage terrain under the construction vehicle; and
   a gradient-indicating assembly supported in the construction vehicle in a visible position, the gradient-indicating assembly including a plurality of concentric circles and a pointer, one of the concentric circles and the pointer moving with the vehicle as the vehicle tilts in a fore-aft direction and in a side-to-side direction, and the other of the concentric circles and the pointer remaining in a true vertical position relative to gravitational forces, such that a relative position of the pointer on the concentric circles thus simultaneously shows a fore-aft levelness and a side-to-side levelness of the construction vehicle relative to a true level position of the construction vehicle.

4. The construction equipment of claim 3, wherein the pointer is a dot.

5. The construction equipment of claim 3, including a transparent top member and a bottom member, one of the concentric circles and pointer being on the top member and the other of the concentric circles and the pointer being on the bottom member, with a transparency of the top member allowing both the concentric circles and the pointer to be seen simultaneously.

6. The construction equipment of claim 5, wherein one of the top and bottom members are movable relative to the other of the top and bottom members.

7. The construction equipment of claim 6, wherein the pointer is a dot on the top member, and concentric circles are on the second member.

8. A method of construction comprising:
   providing a construction vehicle having an operator location with a first surface and having a structural blade configured to grade and move earth; and
   providing a gradient-indicating assembly supported in a visible position on the first surface, the gradient-indicating assembly including a plurality of concentric circles and a pointer;
   moving one of the concentric circles and the pointer with the vehicle as the vehicle tilts in a fore-aft direction and in a side-to-side direction, with the other of the concentric circles and the pointer remaining in a true vertical position, so that the pointer thus simultaneously shows on the concentric circles a fore-aft levelness and a side-to-side levelness of the construction vehicle relative to a true level position of the construction vehicle; and
   controlling the construction vehicle and blade to achieve a desired gradient in both of the fore-aft and side-to-side directions.

9. A method of construction where earth is moved during a construction project, comprising:
   providing a construction vehicle having ground-engaging mobility components, such as wheels or tracks, and having a structural blade configured to grade and move earth as the mobility components engage terrain under the construction vehicle; and
   providing a gradient-indicating assembly supported in the construction vehicle in a visible position, the gradient-indicating assembly including a plurality of concentric circles and a pointer;
   moving one of the concentric circles and the pointer as the vehicle tilts in a fore-aft direction and in a side-to-side direction, with the other of the concentric circles and the pointer remaining in a true vertical position relative to gravitational forces, such that a relative position of the pointer on the concentric circles thus simultaneously shows a fore-aft levelness and a side-to-side levelness of the construction vehicle relative to a true level position of the construction vehicle; and
   controlling the construction vehicle and blade to achieve a desired gradient in both of the fore-aft and side-to-side directions.

\* \* \* \* \*